July 30, 1940.                M. L. MASTELLER                2,209,343
                               HYDRAULIC BRAKE
                             Filed Dec. 29, 1937

INVENTOR.
Malcolm L. Masteller

Patented July 30, 1940

2,209,343

UNITED STATES PATENT OFFICE 2,209,343

HYDRAULIC BRAKE

Malcolm L. Masteller, Miami, Fla.

Application December 29, 1937, Serial No. 182,293

2 Claims. (Cl. 188—152)

This invention relates to improvements in hydraulic brakes and the object of the improvement is to provide a dual system wherein in the event of failure of a portion of the hydraulic means the braking will remain unimpaired.

I attain this object by mechanism illustrated in the accompanying drawing, in which—

Similar numerals refer to similar parts throughout the illustrations.

Figures 1, 2:
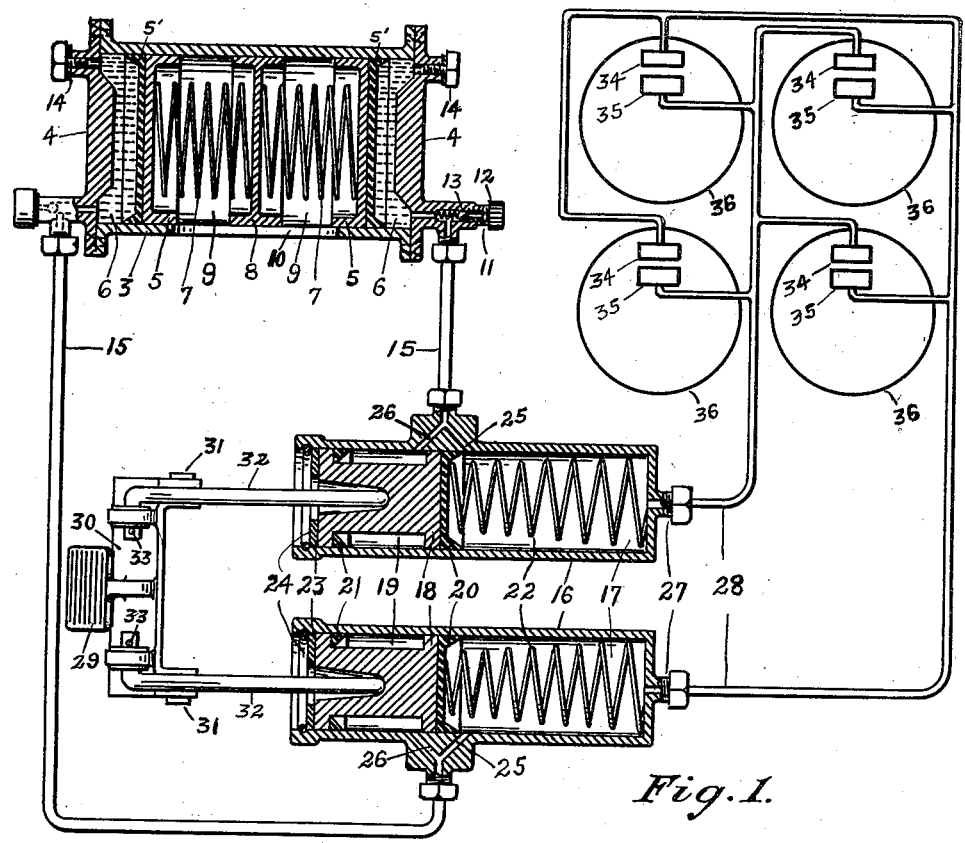
Figure 1 is a diagrammatic sketch, partly in section, showing the invention as applied to the braking of four wheels of a vehicle.
Figure 2 is a vertical section of a brake drum and of dual cooperating brake actuating fluid pressure motors, showing brake shoes and allied parts.

Referring to the drawing, and firstly to Figure 1 thereof—

The dual supply means is the same as is more fully described in my co-pending application Serial No. 104,851, filed October 9, 1936. It comprises casing 3 with detachable heads 4, the latter being formed with bosses for piston stops, all forming a cylindrical chamber within which inversely disposed pistons 5 with their packing cups 5' close off liquid containing compartments 6. Between said pistons 5 and acting upon them is a resilient means including a plurality of compression springs 7 and a piston 8, the latter forming a seat for said compression springs having a bearing upon the wall of said cylinder, for preventing weaving and buckling which would be inherent in a single spring of the required dimensions. Compartments 9 formed between said pistons are provided with opening 10 to the atmosphere for compensation of the changing positions of said pistons. Each of said liquid containing compartments 6 is provided with filler means including a nozzle 11, adapted for engagement with a pressure gun, a cover cap 12 and a check valve 13; also with bleeder vents and their plugs 14. This device provides dual supply means for dual hydraulic systems, maintaining the liquid therein under a normal equalized pressure, delivering it to the lines as required, and being self adapting to the quantity of liquid stored therein and variations in its volume due to changes in temperature. Each of said liquid containing compartments is connected to one of the compressors, hereinafter described, by means of one of the conduits 15.

The dual master cylinder structure comprises a pair of like casings 16, each housing a cylindrical chamber 17, and other like elements as follows: a compressor piston 18, having an annular recess forming compartment 19 between said piston and the wall of said cylinder, with its primary packing cup 20 and secondary packing cup 21; also compression spring 22 urging said piston toward end washer 23 which is held against a shoulder in casing 16 by retaining spring 24 which in turn is held in an annular recess in casing 16 by its own resilience. Liquid from the supply means is admitted to chamber 17 and compartment 19 through passages 25 and 26 respectively which are so arranged that piston 18 in advancing closes off the supply means from the compressor means before any considerable hydraulic pressure is built up. Chamber 17 is also provided with a port and fitting 27 for connecting the respective conduit 28 leading to the hereinafter described brake actuating motors.

The dual compressor pistons 18 have a common actuating means comprising the pedal 29, conveniently attached to crank 30 which is pivoted at 31; and piston rods 32, attached to said crank by means of pins 33; all adapted to advance said pistons in unison.

Each of conduits 28 leads from one of the above described compressors to one of the brake actuating fluid pressure motors 34—35 at each of the brake drums 36, as diagrammatically illustrated, the braking structure being shown in detail in Figure 2 to which reference is now made.

Each of the braking wheels of the vehicle carries a drum 36 affixed thereto and disposed to revolve with it. Associated with each of said drums is a backing plate 37, rigidly mounted in relation thereto. A pair of brake shoes 38 with facings 39 is pivotally mounted upon each of said backing plates by means of anchor bolts 40, said shoes being operable into frictional engagement with said drums, but normally resting upon adjustable stops 41, mounted upon said backing plates, where they are drawn by extension spring 42.

There is also mounted upon each of said backing plates a pair of fluid pressure motors, each comprising a casing 34—35 having a cylindrical bore therein, a pair of inversely disposed pistons 43, with their respective packing cups 44, operating within said cylindrical bore, a compression spring 45 sustaining said packing cups in position and exerting a slight outward pressure upon said pistons 43, maintaining them in position in the absence of hydraulic pressure, a threaded port 46 for attaching the hydraulic means, a threaded bleeder port 47 having a plug which is not shown, and piston rods 48 which are hinged to brake shoes 38 by means of pins 49; all in such manner that each pair of said fluid pressure motors normally act co-operatively to move the corresponding pair of brake shoes with their said facings into braking engagement with their drum, against the resistance of said extension spring.

Each pair of said fluid pressure motors is so mounted and associated with said pivoted brake shoes that they act respectively upon said brake shoes at a greater and a lesser distance from said pivotal mountings, therefore said motors are of different sizes and are proportioned in relation to each other to the end of substantially equalizing the braking ratio delivered through them, the motor 34 acting upon said shoes at said greater distance having its pistons 43 of a lesser diameter than those of the motor 35 acting upon said shoes at said lesser distance.

In the operation of the brakes a forward thrust of the pedal 29 causes the uniform advance of compressor pistons 18 and the displacement of liquid from chambers 17 in equal quantity, said displacement being transmitted by means of conduits 28 into fluid pressure motors 34—35 which in turn actuate said brake shoes 38 into braking engagement with their respective drums. In the event of failure of one of said dual hydraulic systems, rendering one of said dual fluid pressure motors pertaining to each of said drums inoperative, the remaining fluid pressure motor pertaining to each of said drums will act singly to actuate the respective pair of brake shoes, the braking ratio remaining substantially unchanged, as the full power applied to the common actuator will now be transmitted to the brake shoes through the remaining hydraulic system.

What I claim as new and desire to cover by United States Letters Patent is:

1. A brake structure comprising a revolving drum, a backing plate associated with said drum and rigidly mounted in relation thereto, dual brake shoes mounted upon said backing plate and operable into frictional engagement with said drum, dual fluid pressure motors disposed to act either cooperatively or singly in the actuation of both of said shoes, dual hydraulic systems for respectively operating said motors, and mechanical means associating both of said motors with both of said shoes; said dual shoes being pivotally mounted at one end of each of them, and said dual fluid pressure motors being disposed to act respectively upon said shoes at a greater and a lesser distance from their said pivotal mountings, said motors being of different sizes and proportioned in relation to each other so that the one acting at said greater distance exerts a correspondingly lesser effort upon said shoes than the one acting at said lesser distance, to the end that their braking ratios be substantially equal.

2. A braking system comprising a drum; a backing plate associated with said drum and rigidly mounted in relation thereto; braking means mounted upon said backing plate and operable into frictional engagement with said drum, including a plurality of brake shoes pivoted at one end and adapted to be spread to apply the brakes; hydraulic operating means including dual hydraulic systems, each having its own compressor and said dual compressors having a common actuator; dual fluid pressure motors adapted to spread said shoes, one of said motors being associated with and forming a part of one of said dual hydraulic systems and the other of said motors being associated with and forming a part of the other of said hydraulic systems, each of said motors disposed to act upon all of said plural shoes, and so act respectively at a greater and a lesser distance from their said pivotal mountings, said motors being of different sizes and proportioned in relation to each other so that the one acting at said greater distance exerts a correspondingly lesser effort upon said shoes than the one acting at said lesser distance, to the end that their effect upon said shoes be substantially equal; all in such manner that said dual hydraulic systems normally cooperate to apply the brakes, and in the absence of pressure in one of them the other will operate singly, with the same normal displacement as pertained to it prior to said absence of pressure, and with the same result upon the brakes as pertained to both of them combined.

MALCOLM L. MASTELLER.